(12) United States Patent
Fan

(10) Patent No.: US 7,266,079 B2
(45) Date of Patent: Sep. 4, 2007

(54) DYNAMIC NETWORK LOAD BALANCING OVER HETEROGENEOUS LINK SPEED

(75) Inventor: Kan Frankie Fan, Diamond Bar, CA (US)

(73) Assignee: Broadcom Corporation, Irvine, CA (US)

( * ) Notice: Subject to any disclaimer, the term of this patent is extended or adjusted under 35 U.S.C. 154(b) by 1127 days.

(21) Appl. No.: 09/897,660

(22) Filed: Jul. 2, 2001

(65) Prior Publication Data

US 2002/0054567 A1    May 9, 2002

Related U.S. Application Data

(60) Provisional application No. 60/233,338, filed on Sep. 18, 2000.

(51) Int. Cl.
*H04L 12/26* (2006.01)
(52) U.S. Cl. .................. 370/230; 370/235; 370/468
(58) Field of Classification Search ............ 370/230, 370/230.1, 229, 235, 232, 468
See application file for complete search history.

(56) References Cited

U.S. PATENT DOCUMENTS

| | | | | |
|---|---|---|---|---|
| 6,611,874 | B1 * | 8/2003 | Denecheau et al. | 709/239 |
| 6,628,617 | B1 * | 9/2003 | Karol et al. | 370/237 |
| 6,831,893 | B1 * | 12/2004 | Ben Nun et al. | 370/235 |

FOREIGN PATENT DOCUMENTS

| | | |
|---|---|---|
| EP | 0 891 061 | 1/1999 |
| EP | 0 910 195 | 4/1999 |

OTHER PUBLICATIONS

Zhiro Cao et al., "Performance of Hashing-Based Schemes for Internet Load Balancing," Infocom 2000, 19th Annual Joint Conference of the IEEE Computer and Communications Societies, Proceedings, IEEE Tel Aviv, Israel Mar. 26-30, 2000, Piscataway, NJ, USA, IEEE, US, pp. 332-341.

* cited by examiner

*Primary Examiner*—Wing Chan
*Assistant Examiner*—Richard Chang
(74) *Attorney, Agent, or Firm*—Squire, Sanders & Dempsey, LLP

(57) ABSTRACT

A method, apparatus, and computer program product for balancing transmission unit traffic over network links, including disposing transmission units into flows; grouping flows into first flow lists, each corresponding to a selected network link; determining a traffic metric representative of a traffic load on the selected network link; responsive to the traffic metric, regrouping flows into second flow lists corresponding to the selected network link, the regrouping balancing the transmission unit traffic among the network links; and transmitting the respective second flow list over the respective selected network link. The invention also can include a method for transmitting transmission units through a network, including receiving a transmission unit from a transmission unit source; classifying the transmission unit according to a predetermined flow characteristic; selecting a preselected network link over which the transmission unit is to be transmitted; and transmitting the transmission unit over the preselected network link.

68 Claims, 9 Drawing Sheets

DYNAMIC NETWORK LOAD BALANCING OVER HETEROGENEOUS LINK SPEED

CROSS-REFERENCE TO RELATED APPLICATION

This patent application claims the benefit of the filing date of U.S. Provisional Patent Application No. 60/233,338, filed Sep. 18, 2000, and entitled "DYNAMIC NETWORK LOAD BALANCING OVER HETEROGENEOUS LINK SPEED," the entire contents of which are hereby expressly incorporated by reference.

BACKGROUND OF THE INVENTION

1. Field of the Invention

The present invention relates to communications apparatus and methods, particularly to computer networking apparatus and methods, and more particularly to computer networking apparatus and methods for balancing data flow therethrough.

2. Description of the Relevant Art

A common problem in communication networks is maintaining efficient utilization of network resources, particularly with regard to bandwidth, so that data traffic is efficiently distributed over the available links between sources and destinations. Prior art solutions include apparatus and methods that balance data traffic over homogeneous (same-speed) links between heterogeneous or homogeneous computing platforms (servers, clients, etc.). Increasingly, high-performance computing platforms communicate with other computers, routers, switches, and the like, using multiple links which, for a variety of reasons, may operate at disparate link speeds. For example, a server may communicate with other devices using a combination of new and legacy network cards, thus producing a heterogeneous-link-speed environment; or adverse network conditions may degrade the performance of one or more links, effectively presenting a heterogeneous-link-speed environment to the server and its link partner(s). What is needed is a method to dynamically balance transmission unit traffic in a heterogeneous-link-speed environment, and an apparatus and computer program product therefor.

SUMMARY OF THE INVENTION

The present invention satisfies the above needs by providing a method for balancing transmission unit traffic over heterogeneous speed network links, including disposing transmission units into flows; grouping flows into first flow lists corresponding to a selected network link; determining a traffic metric representative of a traffic load on the selected network link; responsive to the traffic metric, regrouping flows into second flow lists corresponding to the selected network link, the regrouping balancing the transmission unit traffic among the network links; and transmitting the respective second flow list over the respective selected network link using a predetermined link-layer transmission protocol. The transmission units can include source information, destination information, and a combination thereof, and the flows are generated by characterizing each of the transmission units according to the source information, the destination information, or a combination thereof. Each of the transmission units can be a packet, a frame, a cell, or a combination thereof. It is desirable that the flow lists be decreasing-size-ordered linked lists. The predetermined link-layer transmission protocol can communicate the transmission unit traffic over the network links in cooperation with a network-layer protocol; and the network-layer protocol cooperates with a transport-layer protocol to communicate the transmission unit traffic across the network links. Either the network-layer protocol or the transport-layer protocol can be a connectionless protocol or a connection-based protocol.

The predetermined link-layer transmission protocol is one of an IEEE STD. 802 protocol, an ATM protocol, an FDDI protocol, an X.25 protocol, an ISDN protocol, a CDPD protocol, and a Frame Relay protocol. The network-layer protocol can be an internet protocol (IP), a Switched Multi-megabit Data Service protocol (SMDS), a general packet radio service (GPRS), a Message Transfer Part Level 3 protocol (MTP3), a an internet packet exchange protocol (IPX), an X.25/X.75 protocol, a connectionless network protocol (CLNP), internet datagram protocol (IDP), a datagram delivery protocol (DDP), a Xerox Network Systems protocol (XNS), or a combination thereof. The transport-layer protocol can be a transmission control protocol (TCP), a user datagram protocol (UDP), a NetBIOS protocol, an H.323 protocol, a GSM/CDMA protocol, a Stream Control Transmission Protocol (SCTP), or a combination thereof.

The Traffic Metric representative of a traffic load on the selected network link characterized by:

$$T_i(f_x, t) = \frac{\frac{N_{Li}(f_x, t) * K_i + N_{Si}(f_x, t)}{Dt} + T_1(f_x, t-1)}{2}$$

where $T_i(f_x,t)$ is a Traffic Metric of Flow $f_x$ in selected link i, sampled at time t, $N_{Li}(f_x,t)$ is the number of transmission units of Flow $f_x$ in selected link i, with a transmission unit size greater than or equal to a preselected size threshold, observed between time t−1 and time t, $N_{Si}(f_x,t)$ is the number of transmission units of Flow $f_x$ in selected link i, with a transmission unit size less than a preselected size threshold, observed between sampling time t−1 and time t, $K_{ix}$ is a predetermined link load factor for Flow x in link i having a value in a range between about 4.0 and about 5.0, and $\Delta t$ is the inter-sampling time, measured as the interval between time t−1 and time t, in selected link i.

Also, an Aggregate Traffic Metric can be employed, which can be characterized by $$TA(i, t) = \sum_x T_i(f_x, t)$$

where

TA(i,t) is an Aggregate Traffic Metric for selected link i, and $T_i(f_x,t)$ is the Traffic Metric of Flow $f_x$ in link i, sampled at time t.

Furthermore, the Aggregate Traffic Metric can be a Scaled Aggregate Traffic Metric characterized by $$STA(i,t) = TA(i,t) * S(i,t)$$

where

STA(i,t) is the Scaled Aggregated Traffic Metrics observed at time t for network link i, TA(i,t) is the Traffic Metric observed at time t for network link i, and S(i,t) is a preselected scaling factor for network link i at time t.

The scaled value can be used to determine a Link Group Arithmetic Mean characterized by $$M(t) = \frac{\sum_{i=1}^{n} STA(i, t)}{n}$$

where

M(t) is the Link Group Arithmetic Mean of Scaled Aggregated Traffic Metrics summed over all network links i, STA(i,t) is the Scaled Aggregated Traffic Metrics observed at time t for network link i, and n is the number of active network links.

The aforementioned Link Group Arithmetic Mean and the Scaled Aggregated Traffic Metric can be used to determine a Link Group Absolute Deviation characterized by $$D(t) = \frac{\sum_{i=1}^{n} |STA(i, t) - M(t)|}{n}$$

where

D(t) is the Link Group Absolute Deviation of the Scaled Aggregated Traffic Metrics summed over all network links i, STA(i,t) is the Scaled Aggregated Traffic Metric observed at time t for network link i, M(t) is the Link Group Arithmetic Mean of the Scaled Aggregated Traffic Metrics summed over all network links i, and n is the number of active network links.

With this information, it thus is possible to classify a network link according to its relative load:

(1) a HIGH traffic load on link i can be characterized by $STA(i,t) \geq M(t)+D(t)$, (2) a LOW traffic load on link i can be characterized by $STA(i,t) < M(t)-D(t)$, and (3) a NORMAL traffic load on link i can be characterized by $M(t)+D(t) > STA(i,t) \geq M(t)-D(t)$.

When a preselected link having a HIGH traffic load is detected preselected flow from a first flow list corresponding to the HIGH traffic load are re-assigned to a second flow list, preferably corresponding to a second preselected link having a LOW traffic load.

The present invention also includes a method for transmitting transmission units through a network, including receiving a transmission unit from a transmission unit source; classifying the transmission unit according to a predetermined flow characteristic; selecting a preselected network link over which the transmission unit is to be transmitted; and transmitting the transmission unit over the preselected network link. The preselected network link can be selected according to the predetermined flow characteristic using a predetermined dynamic load balancing technique, such as the one mentioned above. The method also can include monitoring the operation of a plurality of preselected network links, and re-assigning the predetermined flow characteristic from a first preselected network link to a second preselected network link, if the first preselected network link operationally fails.

BRIEF DESCRIPTION OF THE DRAWINGS

These and other features, aspects and advantages of the present invention will be more fully understood when considered with respect to the following detailed description, appended claims and accompanying drawings, wherein:

DESCRIPTION OF THE EMBODIMENTS

Figure 1:
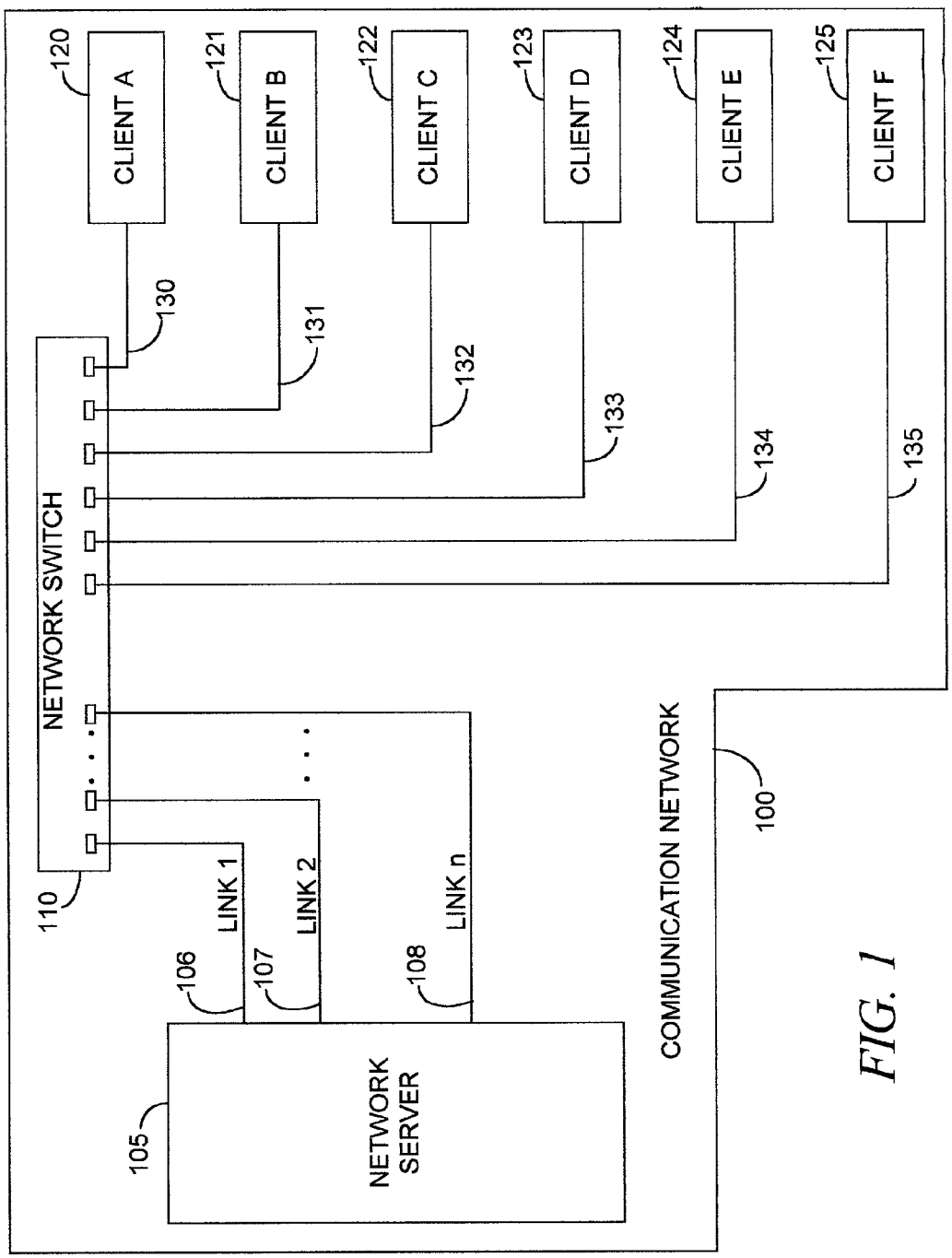
FIG. 1 is a block diagram of a communication network in which the present invention can reside.

The present invention is oriented to a flow-based method, apparatus, and computer program product for dynamically balancing transmission unit loads over heterogeneous-speed links between two devices in a communication network. A flow is a sequence of transmission units transmitted from a particular source to a particular destination, using unicast, multicast, or broadcast techniques. As used herein, a transmission unit is an ordered sequence of data bits, including, without limitation, packets, frames, and cells. Transmission units typically are transmitted through a communication network using one or more protocols arranged in protocol layers, similar to the international standard of a seven-layer Reference Model for Open System Interconnection (OSI model, ISO STD. 7498), which standard is herein incorporated by reference in its entirety. In general, a transmission unit includes data, and communication-related information prepended and appended to the data. The communication-related information can include network, routing, control, priority, and state information, synchronization sequences, source and destination addresses, protocol-specific information, as well as error-correction/checking sequences, data-length information, and a potential myriad of other bit sequences used to facilitate the transmission of data across a communication network. The term "data" includes all forms of digital information, including without limitation, data, text, voice, video, graphics, and the like.

For the purposes of illustrating embodiments of the present invention, three exemplary protocol layers of the OSI model hierarchy will be described: the link layer (Layer Two), the network layer (Layer Three), and the transport layer (Layer Four). A skilled artisan would realize that there is no bright-line distinction between these layers, and that the functionality of one layer often overlaps with the functionality of an adjacent layer, particularly as the nature of the reference model employed varies. Furthermore, a link-layer protocol can encompass functionality extending well into the physical layer (Layer One) and, in the context of the present invention, references to link layer, or Layer Two, protocols will also be considered to include Layer One where appropriate.

Exemplary Layer Two protocols can include, without limitation, an IEEE STD. 802-1990 protocol, an ATM protocol, an FDDI protocol, an X.25 protocol, an ISDN protocol, a CDPD protocol, a Frame Relay protocol, and a combination thereof. IEEE STD. 802-related protocols are inclusive of protocols such as IEEE STD. 802.3 (CSMA-CD/Ethernet), IEEE STD. 802.4 (Token Bus), IEEE STD. 802.5 (Token Ring), IEEE STD. 802.11 (Wireless LAN), IEEE STD. 802.15 (Wireless Personal LAN) and IEEE STD. 802.16 (Broadband Wireless Access). Exemplary Layer Three (network layer) protocols can include, without limitation, connection-oriented and connectionless protocols such as an internet protocol (IP), a Switched Multi-megabit Data Service protocol (SMDS), a general packet radio service (GPRS), a Message Transfer Part Level 3 protocol (MTP3), a an internet packet exchange protocol (IPX), an X.25/X.75 protocol, a connectionless network protocol (CLNP), internet datagram protocol (IDP), a datagram delivery protocol (DDP), a Xerox Network Systems protocol (XNS), and a combination thereof. Exemplary Layer Four (transport layer) protocols can include, without limitation, connection-oriented and connectionless protocols such as a transmission control protocol (TCP), a user datagram protocol (UDP), a NetBIOS protocol, an H.323 protocol, a GSM/CDMA protocol, a Stream Control Transmission Protocol (SCTP), and a combination thereof. All of the standards representative of the aforementioned protocols are hereby incorporated by reference herein in their entireties.

A particular source device can be identified by its IP (internet protocol) address, and a port number. The particular port number at the source device is identified by either a port number which is specific to a particular process, or by a standard port number for the particular transmission protocol type. For example, a standard port number for the TCP protocol type is 6 and a standard port number for the UDP protocol type is 17. Other protocols which may have standard port numbers include the FTP protocol, the TELNET protocol, an internet telephone protocol, or an internet video protocol; these protocols are known in the art of networking. Similarly, the particular destination device is identified by its IP address; the particular port number at the destination device is identified by either a port number which is specific to a particular process, or a standard port number for the particular transmission protocol type.

Flows can be classified using a variety of characteristics, including source address, destination address, or both. Other characteristics of a particular transmission unit, such as priority, protocol type, control data, and the like may be used. Typically, in a communication network, a transaction between devices involves bidirectional flows, e.g., a device responds to a received sequence of transmission units from a sender by transmitting other transmission units to the sender. With regard to the present invention, however, it is desirable to analyze and balance unidirectional flows, e.g., flows being transmitted by a server, although bidirectional flow balancing may be effected under the inventive principles herein.

In an exemplary IP-oriented flow, it is desirable that all packets belonging to the same flow bear the same source address, destination address, and priority. Similarly, in an exemplary TCP-oriented flow, it is desirable that all packets belonging to the same flow bear the same source port and/or destination port, and priority.

For the purposes of illustration, the present invention is described within the context of unidirectional flows emanating, for example, from a device employing multiple, heterogeneous-speed links in an environment defined by IEEE STD. 802.3, 2000 Ed., which standard is hereby incorporated herein in its entirety. Hereinafter, "Standard Ethernet" will describe 10 Mbps service under IEEE STD. 802.3, "Fast Ethernet" for 100 Mbps service, and "Gigabit Ethernet" for 1000 Mbps service.

In the communication network 100 of FIG. 1, network server 105 communicates, via network switch 110, with multiple clients 120-125. Server 105 is coupled with switch 110 using, for example, n communication links, with each link 106, 107, 108 being configured to transmit data at disparate link speeds. For example, link 106 may be a Standard Ethernet link, link 107 may be a Fast Ethernet link, and link 108 may be a Gigabit Ethernet link. The invention herein provides dynamic flow balancing of communication traffic over heterogeneous-speed links 106, 107, 108 such that each active link bears a desirable load, generally commensurate with the link's physical transmission characteristics.

Figure 2:
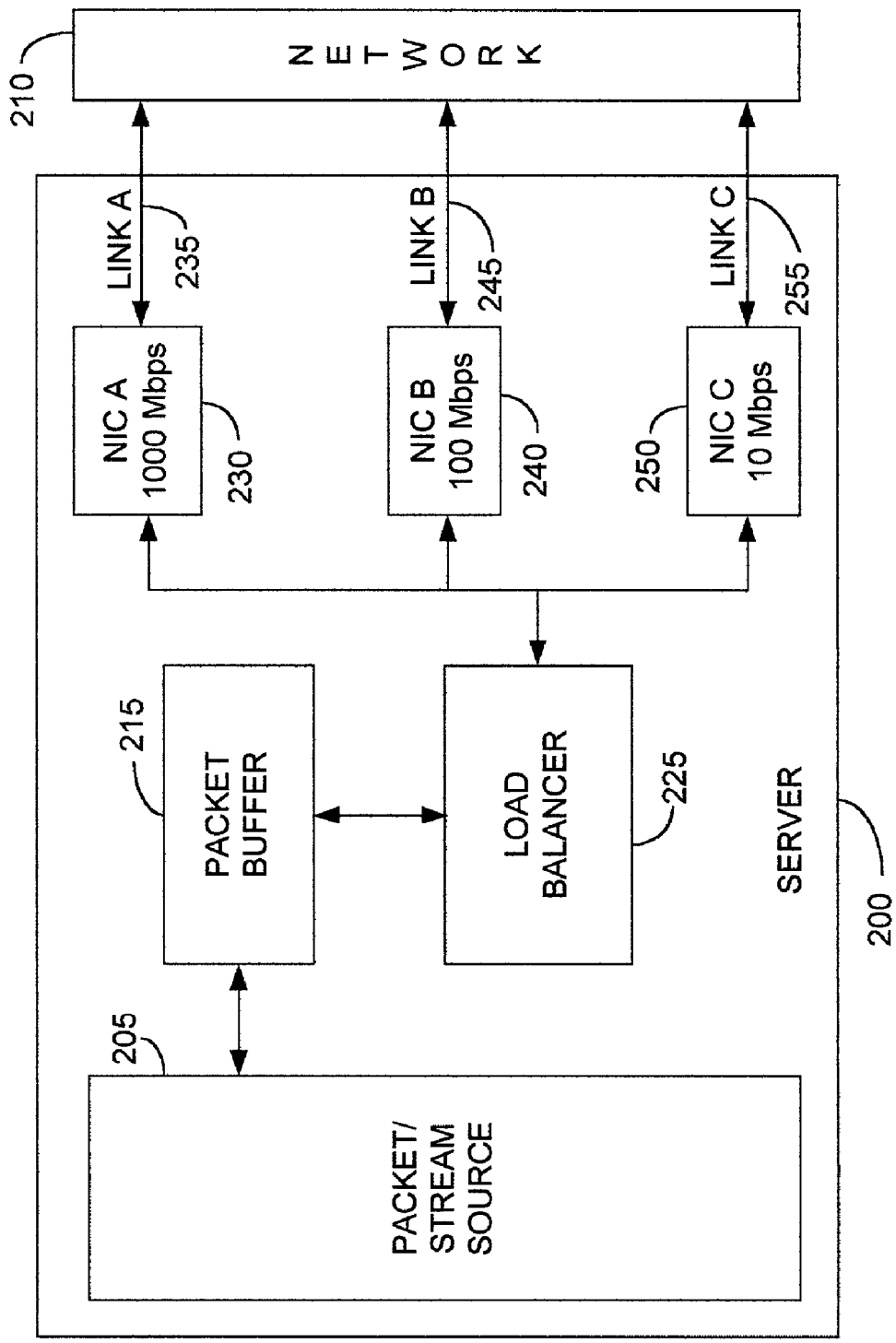
FIG. 2 is a block diagram of a communication server in according to an embodiment of the present invention.

FIG. 2 illustrates a simplified server 200 having packet source 210 coupled with network 220 through load balancer 225, using network interface card (NIC) A 230, NIC B 240, and NIC C 250. Server 200 also can employ packet buffer 215 interposed between source 210 and load balancer 225. Although three NICs are shown in FIG. 2, a modern server can employ an arbitrary number of network interfaces, subject to resource constraints. In this example, NIC A can be a 1000 Mbps NIC, with Link A being a Gigabit Ethernet link; NIC B can be a 100 Mbps NIC, with Link B being a Fast Ethernet link; and NIC C can be a 10 Mbps NIC, with Link C 255 being a standard Ethernet link. Because each NIC and associated link can provide differing bandwidth capacities when active, each will exhibit differing traffic handling characteristics, potentially leading to overutilization of one or more links, while others are underutilized. When used with the present invention, links A, B, and C can be a variety of links of arbitrary capacities, and potentially have heterogeneous link speeds, and not merely the three types of links illustrated. The present invention also may be used with homogeneous speed links as well. Given its configuration, Link A can transmit transmission units at a rate approximately two orders of magnitude greater than transmission rate of Link C. Link A can transmit transmission units at a rate approximately one order of magnitude greater than transmission rate of Link B. Similarly, Link B can transmit transmission units at a rate approximately two orders of magnitude greater than transmission rate of Link C. A corollary to Link C having lower throughput than either Link A, or Link B, is having a longer transmission time than either Link A, or Link B, for a given transmission unit size. Thus, the impact of a larger transmission unit on the slowest link can be disproportionate to the same transmission unit's impact on the highest-capacity link in a system. Accordingly, it is desirable to take into consideration factors other than raw link speed, such as time-for-transmission, when balancing transmission unit traffic among the several links in a communication system. Because the transmission capacity on a given link can vary over time due to conditions of the network to which a link is coupled, the physical environment of the link, and the state of the NIC, it is desirable to provide adaptive, dynamic load balancing responsive to sensed conditions, and an aspect of the present invention can include such dynamic load balancing. The present invention also can provide desirable automatic failover among the multiple NICs disposed within a server, thereby maintaining transmission unit transmission in the face of one or more link failures, and affording fault-tolerance in addition to dynamic load balancing.

Figure 3:
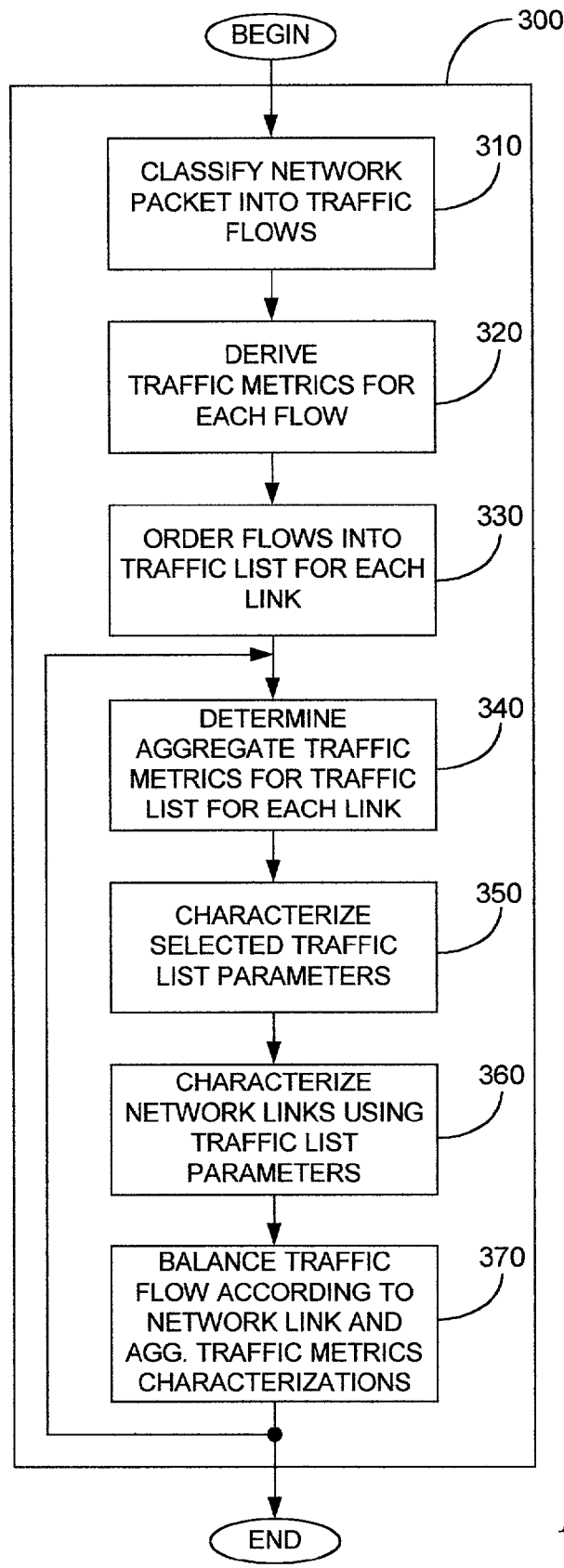
FIG. 3 is a flow diagram of a dynamic load balancing method according to an embodiment of the present invention.

FIG. 3 illustrates one embodiment of method 300 for effecting dynamic load balancing of heterogeneous-speed links in a communication network. Solely for the sake of illustration, transmission units are described in terms of packets, although other forms of transmission units, including without limitation, cells, frames, and combinations of packets, cells, and frames may be used, as well as any sequence of data bits intended to convey information.

In general, method 300 includes classifying a received network transmission unit (e.g., a packet) into a traffic flow, operation 310; deriving metrics, such as traffic metrics, for selected flows, operation 320; and ordering flows into a link-specific traffic list, operation 330. It is desirable that metrics be derived for each flow, that the traffic lists so created be ordered, for example, by flow size, and that the traffic lists be linked lists. Once flows have been thus arranged, it further is desirable to determine aggregated metrics for a selected flow list related to a particular link, operation 340, and to derive preselected link group characteristics of the group of flows represented in the flow list for a selected link, operation 350. The utilization of a selected link can then be determined using the preselected link group characteristics, operation 360. For example, the utilization of a link may be HIGH, NORMAL, or LOW relative to the link's inherent transmission capacity, and to other links. With link utilization thus determined, it then is desirable to balance the traffic flow according to aggregated traffic metrics, or the associated network link characterizations, or both, operation 370. For example, a particular flow may be re-assigned from a first link having HIGH utilization, or traffic, to a second link having LOW utilization, or traffic, responsive to the aforementioned metrics and/or link characterizations.

Exemplary techniques for implementing each of the operations of method 300 follow forthwith.

Determine Traffic Metric for Each Flow in Each Link.

In one embodiment of the present invention, it is desirable to determine a metric of a flow $f_x$ in a selected link i, which in this case is a traffic-related metric according to the equation:

$$T_i(f_x, t) = \frac{\frac{(N_{Li}(f_x, t)) * K_i + N_{Si}(f_x, t)}{\Delta t} + T_i(f_x, t-1)}{2}$$

where $T_i(f_x,t)$ is the Traffic Metric of Flow $f_x$ in link i, sampled at time t;

$N_{Li}(f_x,t)$ is the number of packets of Flow $f_x$ in link i, with a size greater than or equal to a preselected size threshold, observed between sampling time t−1 and t;

$N_{Si}(f_x,t)$ is the number of packets of Flow $f_x$ in link i, with a size less than a preselected size threshold, observed between sampling time t−1 and t;

$K_{ix}$ is a predetermined link load factor; and $\Delta t$ is the inter-sampling time, measured between the time sample t−1 and sample t are taken in link i.

Empirically, a suitable value for link loading factor, $K_{ix}$, can be between about 1.0 and about 10.0, although network conditions, components, and other network architectural and operational factors, may warrant other values. In one embodiment of the present invention, the link loading factor, $K_{ix}$, is desired to be a constant with a desired range of between about 4.0 and about 5.0. Additionally, a suitable size for the aforementioned preselected size threshold is about 1 kilobyte (1,024 bytes), although different values may be selected to accommodate different network conditions, components, and other network architectural and operational factors.

Order Flows in Each Link

Figure 4:
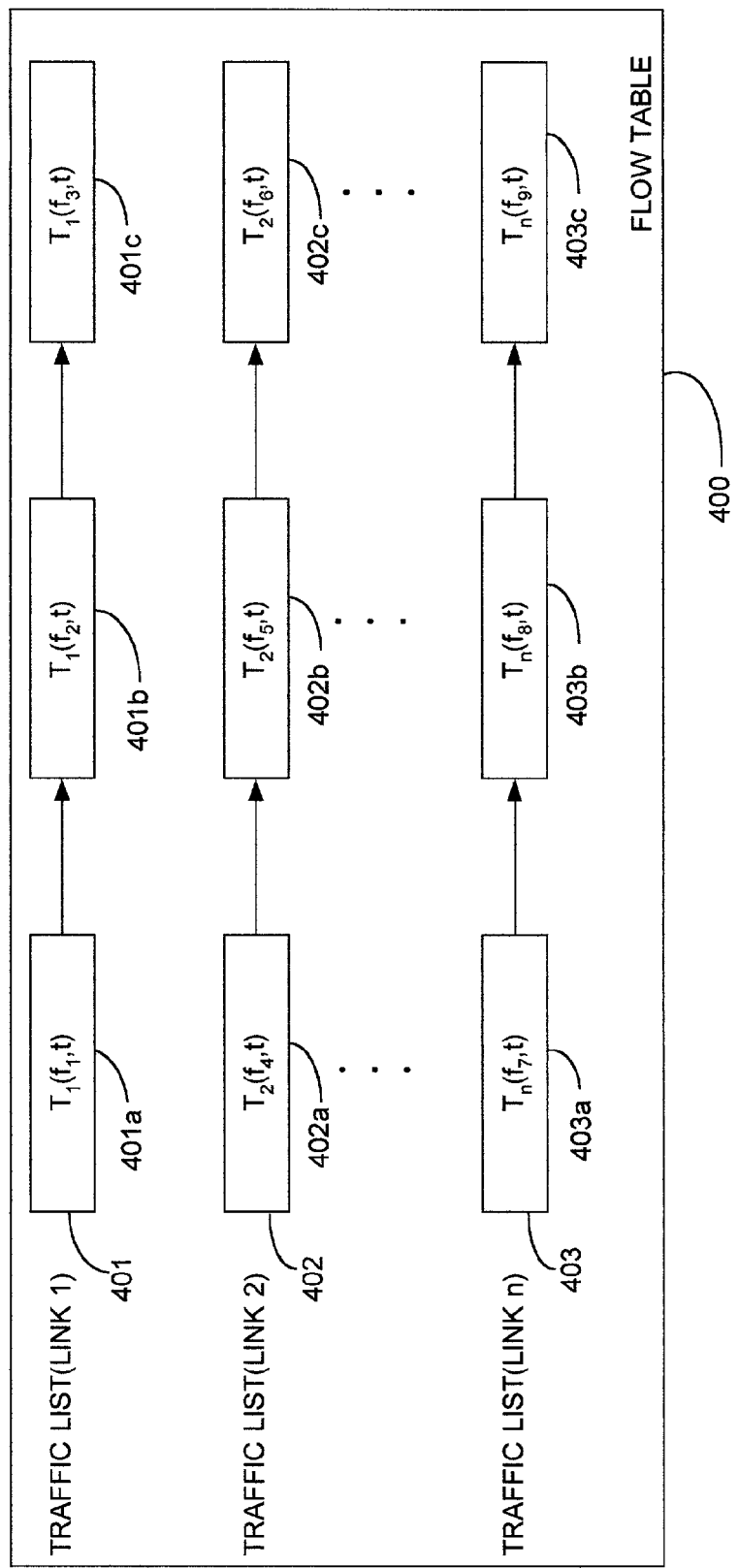
FIG. 4 is an illustration of a Flow Table having Flow Lists within the context of the invention herein.

FIG. 4 illustrates a Flow Table, $T_f$, 400, here composed of three Traffic Flow Lists 401, 402, 403, each corresponding to a respective selected link i (where i=1 . . . n links). Traffic Flow List $T_1$ 401, corresponding to link 1, includes information corresponding to Flow $f_1$ 401a, Flow $f_2$ 401b, and Flow $f_3$ 401c; Traffic Flow List $T_2$ 402, corresponding to link 2, includes information corresponding to Flow $f_4$ 402a, Flow $f_5$ 402b, and Flow $f_6$ 402c; and Traffic Flow List $T_n$ 403, corresponding to link n, includes information corresponding to Flow $f_7$, Flow $f_8$, and Flow $f_9$. It is desirable that each Traffic Flow List, $T_i$, be constructed as a linked list. Although Flow Table 400 is symmetric, there is no requirement for symmetry in Table 400 or in any list 401-403 in Table 400. Also, Flow Table 400 may include information for a large number of Flows (e.g., on the order of $10^4$ flows), which Flows are distributed according to the link/network conditions. It is desirable that each Flow entry e.g., entry 401a, 401b, 401c, in a selected list, e.g., Traffic Flow List 401, be ordered by traffic metric value, associated with sample time t. For example, in one embodiment, it is desirable to order traffic flows by descending traffic metric value:

$$T_i(f_1, t) \geq T(f_2, t);$$

$$T_i(f_2, t) \geq T(f_3, t); \text{ and}$$

$$T_i(f_1, t) \geq T(f_3, t).$$

Although other orderings may be effected, descending metric size order permits adjustments of potentially finer granularity to the balance of the traffic load.

Determine Aggregated Traffic Metrics

For each Flow List, $T_i$, for a given link i, an Aggregated Traffic Metric $TA_i$ (or TA(i,t), representing the total amount of traffic observed between sampling times t−1 and t, for the network link i, can be calculated by summing all of the Traffic Metrics of the Flows in the Flow List.

$$TA(i, t) = \sum_x T_i(f_x, t)$$

A scaling factor, $S_i$ (or S(i,t)), which may be inversely proportional to the speed of the network link, can be applied to each $TA_i$ to account for the speed difference, to produce the Scaled Aggregated Traffic Metrics ($STA_i$) for each link i. That is:

$$STA(i,t)=TA(i,t)*S(i,t)$$

where $STA(i,t)$ (or $STA_i$) is the Scaled Aggregated Traffic Metrics observed at time t for network link i;

$TA(i,t)$ (or $TA_i$) is the Traffic Metric observed at time t for network link i; and $S(i,t)$ (or $S_i$) is the preselected scaling factor, which can be generally inversely proportional to the speed of network link i at time t.

Determine Preselected Link Group Characteristics

Two statistical parameters, such as, for example, link group arithmetic mean and link group absolute deviation, can be calculated from the $STA_i$ (Scaled Aggregated Traffic Metrics), in the following manner:

$$M(t) = \frac{\sum_{i=1}^{n} STA(i, t)}{n}$$

$$D(t) = \frac{\sum_{i=1}^{n} |STA(i, t) - M(t)|}{n}$$

where $M(t)$ is the link group arithmetic mean of the Scaled Aggregated Traffic Metrics summed over all network links i;

$D(t)$ is the link group absolute deviation of the Scaled Aggregated Traffic Metrics summed over all network links i; and n is the number of active network links.

Categorize Link Traffic Load

Figure 5:
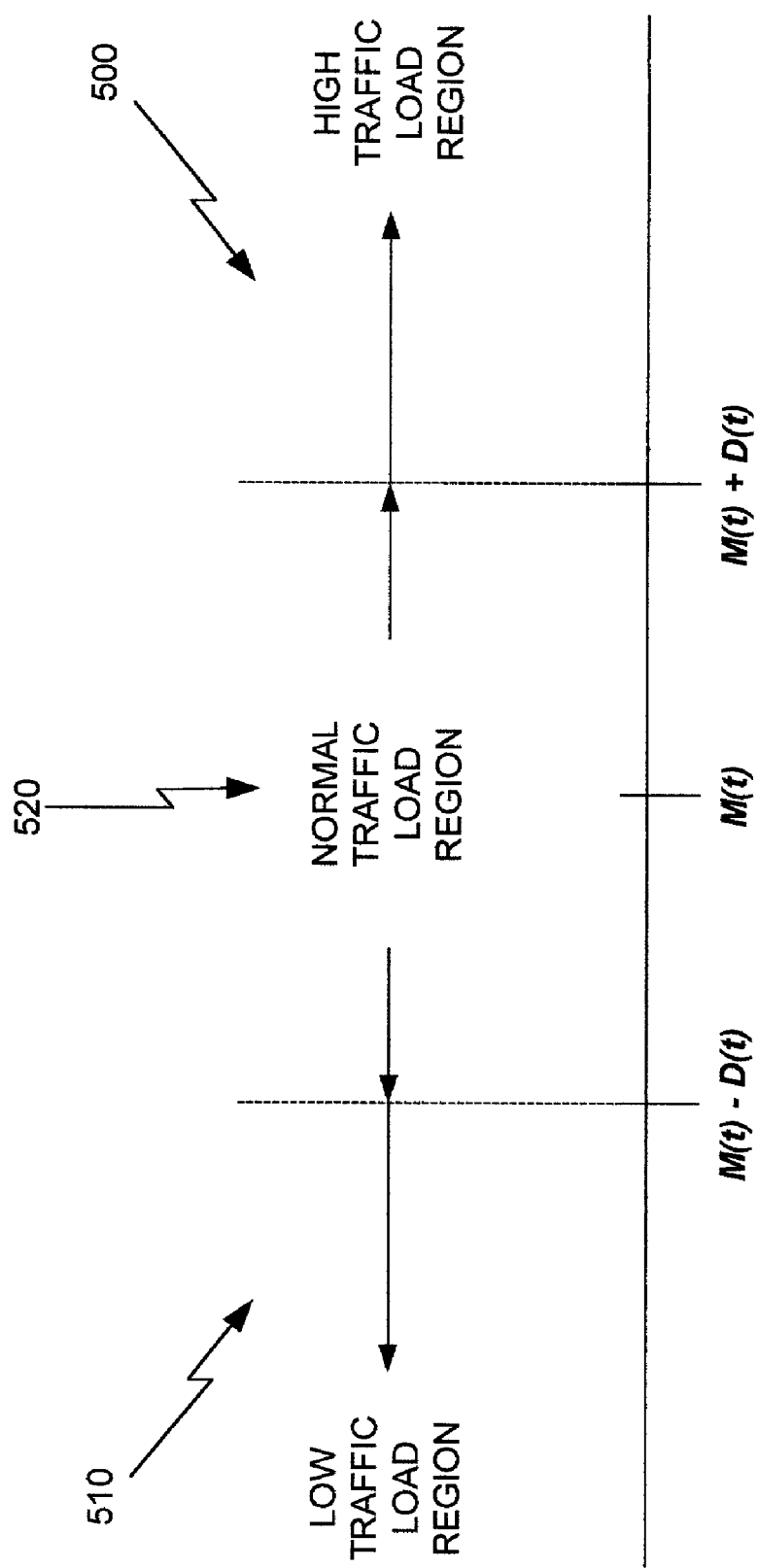
FIG. 5 is a diagrammatic representation of flow classification within the context of the invention herein.

FIG. 5 generally illustrates one technique to categorize Traffic Load on a particular link. A link may be considered to have a HIGH traffic load when a selected traffic metric exceeds a predetermined upper threshold value (region 500), a LOW traffic load when the selected traffic metric is below a predetermined lower threshold value (region 510), and a NORMAL traffic load when the selected traffic metric falls between the predetermined lower threshold value and the predetermined upper threshold value (region 520). Although many metrics may be employed, it can be advantageous to use the Scaled Aggregated Traffic Metric as the selected traffic metric. Similarly, it can be useful to combine the arithmetic mean and the absolute deviation of the Scaled Aggregated Traffic Metrics to produce the predetermined lower threshold value and the predetermined upper threshold value.

In one embodiment of the present invention, a link i can be considered to have a HIGH traffic load when the Scaled Aggregated Traffic Metric for that link reaches or exceeds the link group arithmetic mean by one link group absolute deviation, i.e., $$STA(i,t) \geq M(t)+D(t)$$

Link i may be categorized as having a LOW traffic load when $$STA(i,t) < M(t)-D(t)$$

Finally, link i may be categorized as having a NORMAL traffic load when the Scaled Aggregated Traffic Metric for that link falls between the aforementioned respective preselected upper and lower threshold values, i.e., $$M(t)+D(t) > STA(i,t) \geq M(t)-D(t)$$

STEP 6. Manipulate Flows To Balance Load In Selected Link.

With the links thus classified, the transmission unit load can be balanced by manipulating the flow list such that a flow assigned to a link with HIGH utilization, or traffic load, is re-assigned to another link having a LOW utilization, or traffic load. However, it is desirable to re-assign flows in a manner that does not force a LOW utilization link into a HIGH utilization state. Where flow lists are ordered in descending metric value, it is desirable to assign a flow from the "tail," or low metric end of a selected flow list for a selected HIGH traffic link, to the flow list of a corresponding LOW traffic link.

Figure 6A:
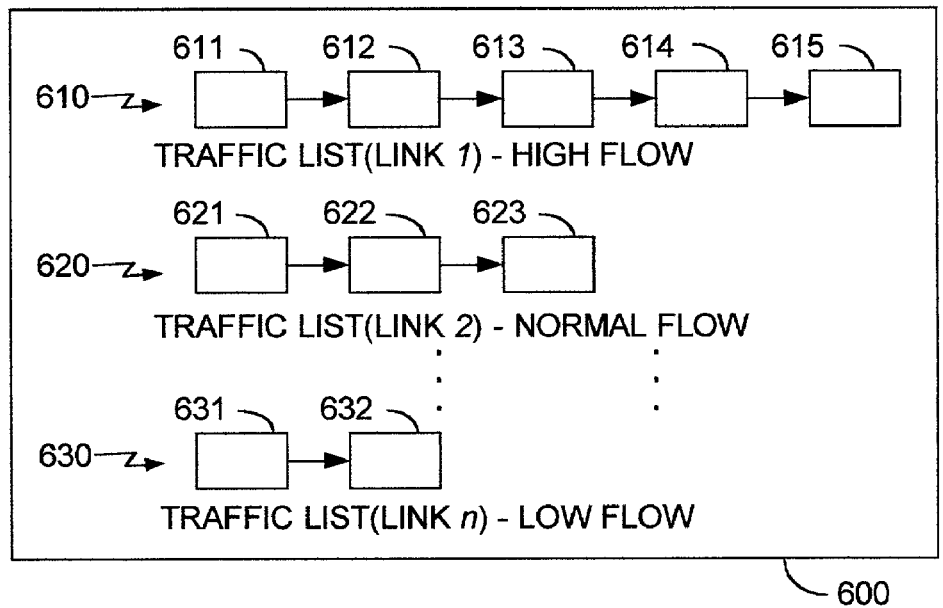
FIG. 6A is a block diagram illustration of a Flow Table having Flow Lists therein, according to the present invention.
Figure 6B:
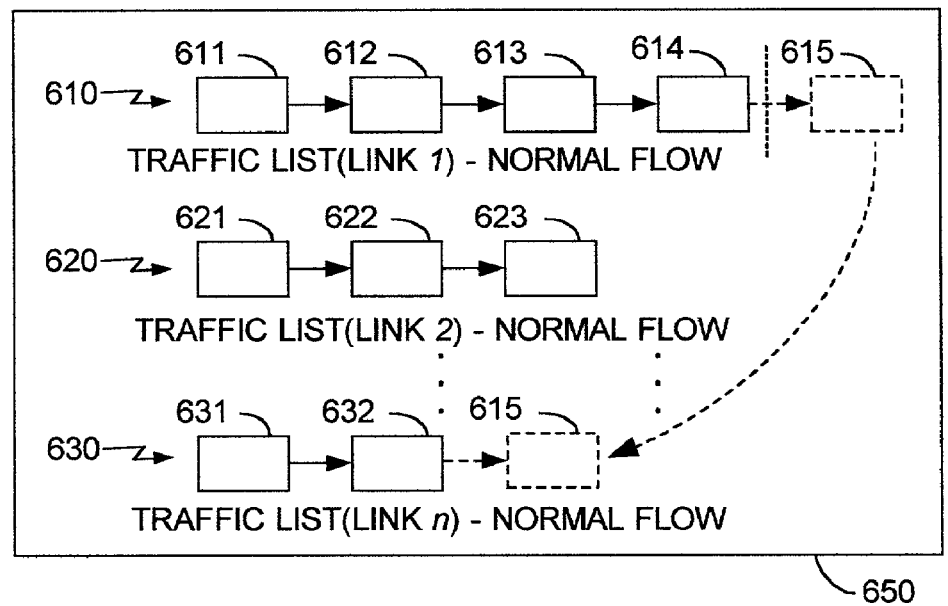
FIG. 6B is a block diagram illustration of a Flow Table having Flow Lists with re-assigned Flows therein, according to the present invention.

In FIG. 6A, exemplary Flow Table 600 includes Traffic Flow List 610 representative of Link 1; Traffic Flow List 620 representative of Link 2; and Traffic Flow List 630 representative of Link n. In this example, List 610 is a linked list of Flows 611, 612, 613, 614, and 615; List 620 is a linked list of Flows 616, 617, and 618; and List 630 is a linked list of Flows 619 and 620. It is desirable to order the Flows in each Flow Traffic List by descending Flow Traffic Metric value. For the purposes of illustration only, assume that characterization of Lists 610, 620, and 630, results in Link 1 being categorized as a HIGH flow link, Link 2 being categorized as a NORMAL flow link, and Link n being categorized as a LOW flow link. Further assume that analysis of link group characteristics indicate that, by re-assigning Flow 615 to Link n, the traffic load on both Link 1 and Link n can be dynamically balanced to provide NORMAL flow characteristics, relative to the transmission capabilities of each Link, and to substantially preserve the NORMAL flow characteristics of Link 2. FIG. 6B illustrates re-assigning Flow 615 from transmission over Link 1 to transmission over Link n.

Figure 7:
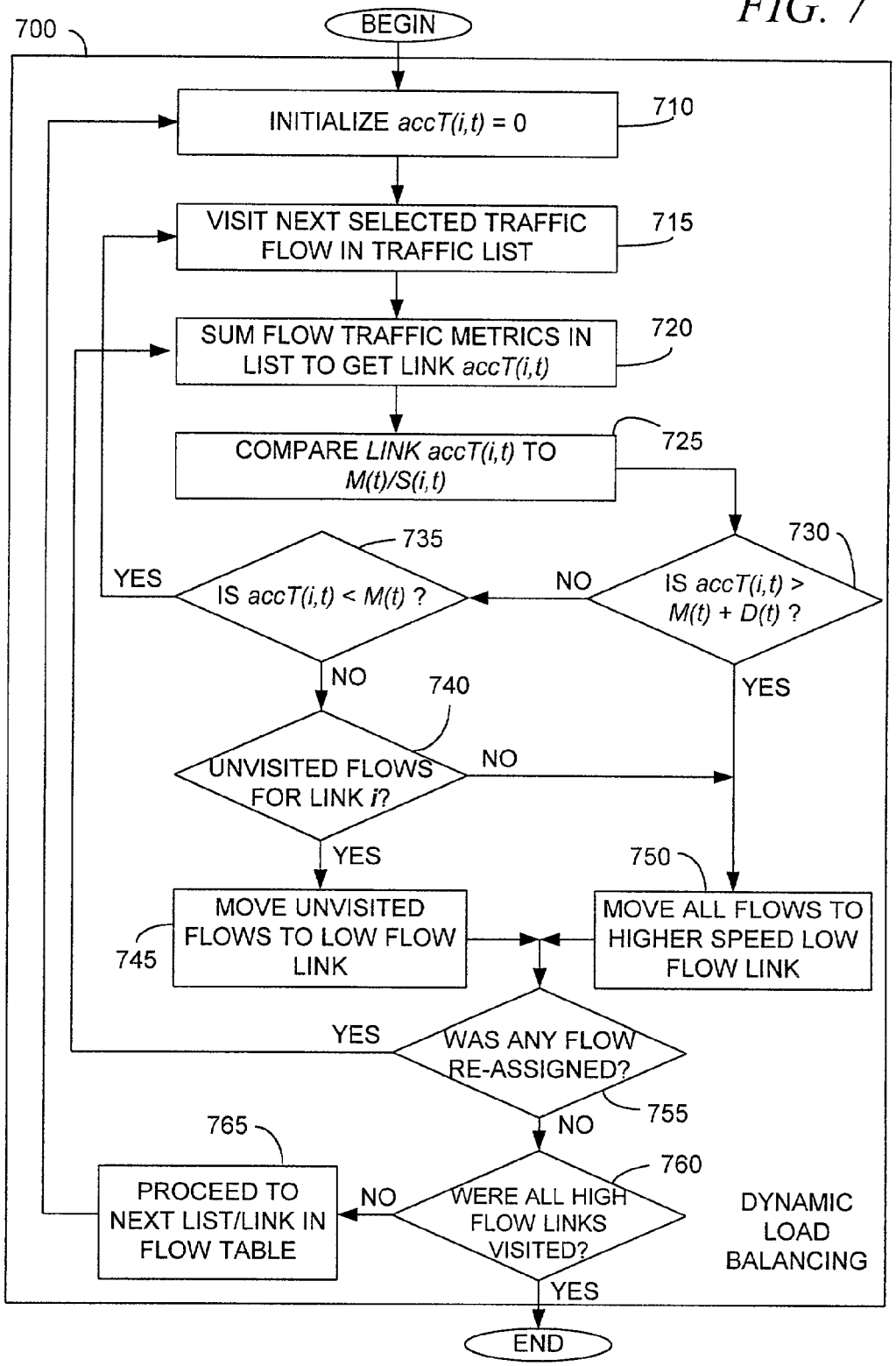
FIG. 7 is a flow diagram of another aspect of a dynamic load balancing technique according to the present invention.

One technique to efficiently balance transmission unit flow by re-assigning flows includes the use of an Accumulated Traffic Metric, $accT(i,t)$. After determining traffic metrics, ordering flow lists, and characterizing the transmission links, as described above, dynamic load balancing, method 700 illustrated in FIG. 7, can proceed by:

a) Initializing $accT(i,t)$ to zero (operation 710);

b) Visiting a selected Flow in a selected Traffic Flow List (operation 715);

c) Summing the Traffic Metrics across the selected Flow to create the Accumulated Traffic Metric, $accT(i,t)$, for the selected Link i:

$$accT(i,t)=accT(i,t)+T_i(f_x,t) \qquad \text{(operation 720)};$$

d) Comparing $accT(i,t)$ to the dividend of $M(t)$ divided by scaling factor, $S(i,t)$, i.e.:

$$\text{COMPARE}\left[accT(i, t), \frac{M(t)}{S(i, t)}\right]; \qquad \text{(operation 725)}$$

e) If $accT(i,t) > (M(t)+D(t))$, then going to step h (operation 730);

f) If $accT(i,t) < M(t)$, then visiting the next Flow in the selected List and go to step c (operation 735);

g) If any unvisited Flow(s) remains in the selected List (operation 740), then re-assigning remaining unvisited Flow(s) to LOW flow Traffic Flow Link (operation 745);

h) If no unvisited Flow(s) remain (operation 740), then re-assigning all Flows in the selected Traffic Flow List to a network link having a LOW Traffic Flow, provided there exists a link having a higher link speed than the selected link (operation 750);

i) If any Flow is re-assigned, then repeating steps c through g, until a maximum re-assignment count is reached, or no Flow can be re-assigned (operation 755);

j) Visiting next Link in Flow Table and go to step a (operation 765); and k) Repeating steps a) through j) until all HIGH flow network links are visited (operation 760).

Figure 8:
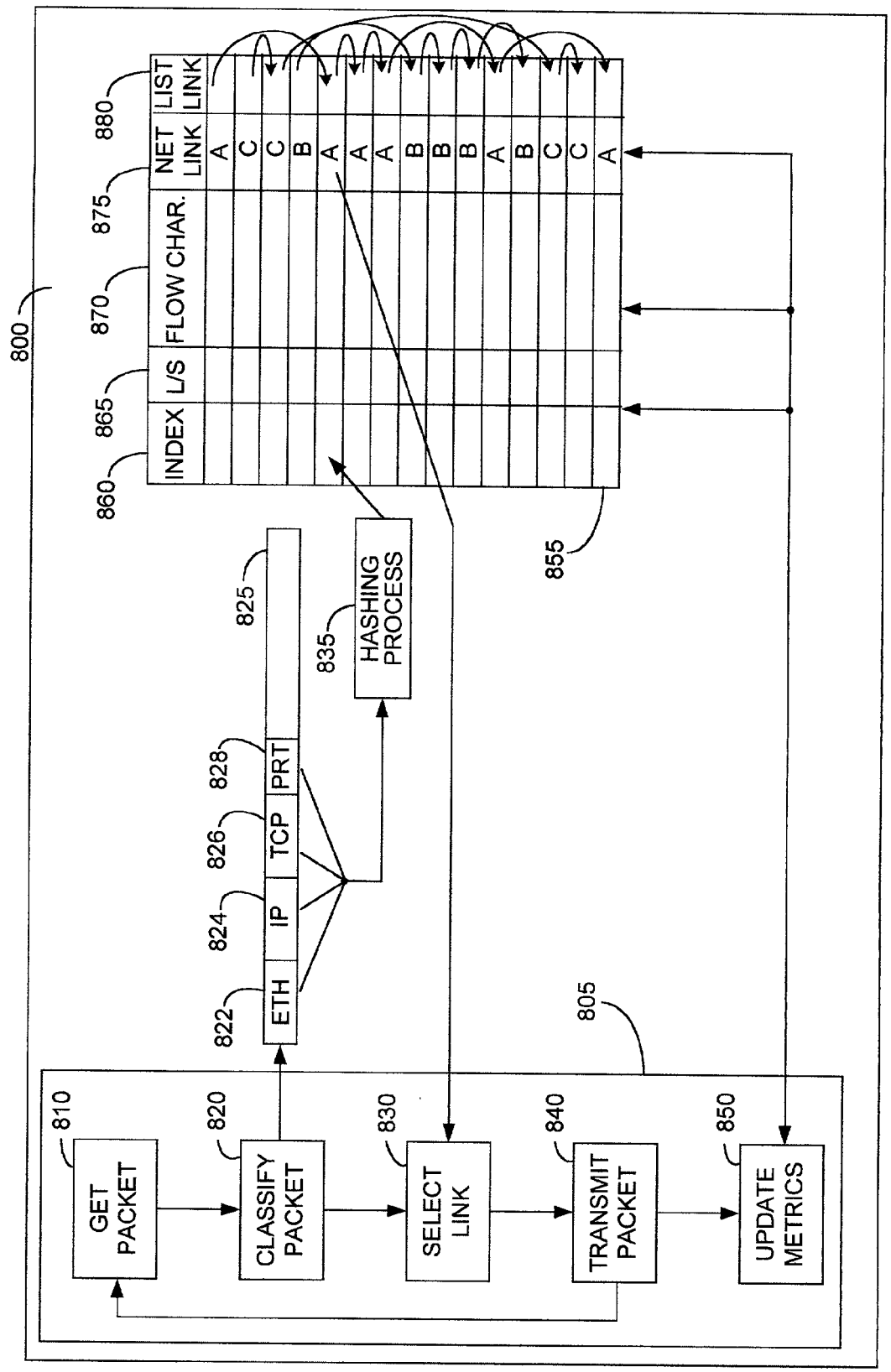
FIG. 8 is a diagrammatic representation of another embodiment of the present invention.

FIG. 8 illustrates one embodiment of load balancing apparatus 800, which employs a flow classification dynamic load balancing technique 805 to select the link over which a transmission unit, such as a packet, will be transmitted. In general, process 805 can include receiving a packet from a packet source, such as a packet buffer (not shown) operation 810; classifying the packet according to a predetermined flow characteristic, operation 820; selecting the network link over which the packet is to be transmitted, operation 830; and transmitting the packet over the preselected network link, operation 840. In an embodiment of the present invention, it is desirable to periodically update the metrics, flow characteristics and network links associated with selected flows, operation 850. Relative to operation 820, classifying the packet according to a predetermined flow characteristic, it is desirable to maintain link table 855 with each "row" entry, for example, relating to flow characteristics 870 representative of a particular flow, counters 865 for the number of large and small transmission units associated with a flow, and the network link 875 to which flows having the particular flow characteristics 870 is to be assigned to transmission. To provide sufficient granularity of flow characteristics, it is desirable that the list have a number of entries approximately one-to-two orders of magnitude greater than the number of links. A greater number of entries may be provided, however, such may be at the expense of resources and performance. One manner by which a flow can be classified is to generate a index 860 into table 855, for example using hashing process 835. Hashing is the technique of using scatter storage in computer programs, for fast access to items contained in large lists. Such hashing functions are myriad and are well-known in the art. Input to hashing process 835 can include ethernet type information 822, IP address 824, TCP address 826, port number 828, and other information which serves to identify a particular flow. Process 835 can produce index 860 into table 855. Entries for flows 870 associated with a particular network link 875 can be ordered as a linked list using list link entries 880. It is desirable that hashing function 835 produce the same index 860 for transmission units having the same flow characteristics 870. When the incoming packet is classified, transmission unit size counter 865 can be updated.

Using load balancing techniques, network link values 875 can be assigned to particular flow types 870 so that when hashing process 835 produces index 860 for an incoming packet, index 860 corresponds to the type of flow with which the incoming packet is associated, and a particular link over which the incoming packet is to be transmitted. In this manner, a transmission unit or packet having particular flow characteristics can be assigned to a selected link, operation 830, from which it is transmitted during operation 840. One technique for updating table 855, particularly updating net link entries 875 can be method 300 described in relation to FIG. 3.

Figure 9:
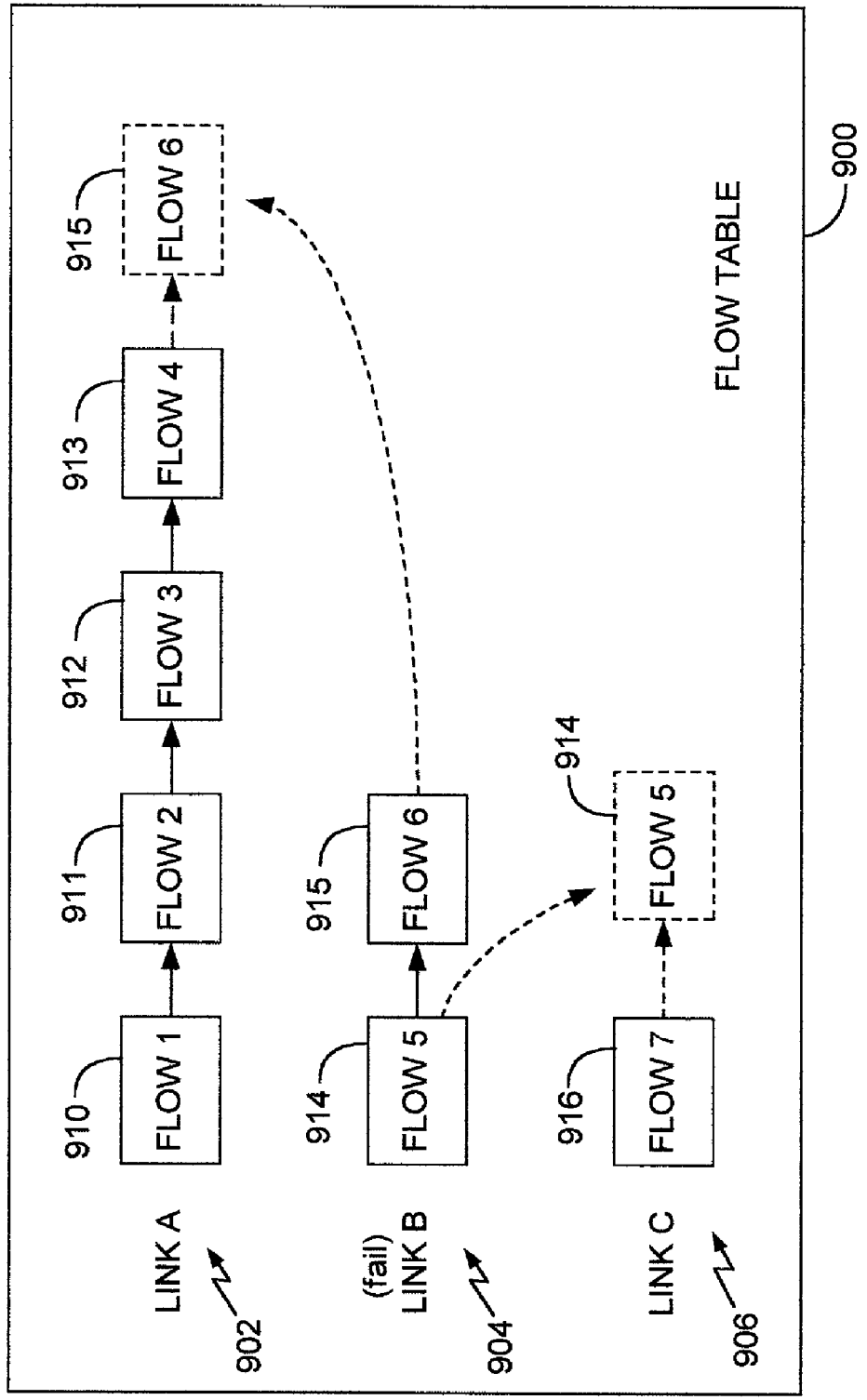
FIG. 9 is a block diagram representation of a Flow Table having Flow Lists with re-assigned Flows therein, according to another aspect of the present invention.

In the event a particular network link fails, the apparatus and method of the present invention also is capable of providing fault-tolerance in the event a network link fails. FIG. 9 illustrates how failover can be achieved during network link failure. Link A 902, Link B 904, and Link C 906 in FIG. 9, can be respectively associated, for example, with NIC A 230, NIC B 240, and NIC C 250 in FIG. 2. Using active or passive fault detection methods, the failure of NIC B 240 can immediately be recognized, causing an embodiment of the inventive method herein to reassign flows associated with the failed link to active links. In FIG. 9, Flow Table 900 originally contained flow entries 914 and 916 assigned to Link B 904. When NIC B 240 fails, Link B 904 also fails. Using method 300 described relative to FIG. 3, flow 915 may be re-assigned to Link A 902; and flow 914 may be re-assigned to Link C 906. This ensure that the transmission units associated with a particular flow continue to flow and are not interrupted by the failure, for example, of Link B 904. The above failover technique can be employed to re-distribute flows among active links, or it can be employed to route flows to a Hot Standby NIC which may be provided to accommodate for anticipated link failures.

The mechanisms and processes set forth in the present description may be implemented using a conventional general purpose microprocessor programmed according to the teachings in the present specification, as will be appreciated to those skilled in the relevant art(s). Appropriate software coding can readily be prepared by skilled programmers based on the teachings of the present disclosure, as will also be apparent to those skilled in the relevant art(s).

The present invention thus also includes a computer-based product which may be hosted on a storage medium and include instructions which can be used to program a computer to perform a process in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed is:

1. A method for balancing transmission unit traffic over network links, comprising:
   a. disposing transmission units into flows;
   b. grouping flows into first flow lists, each of the first flow lists corresponding to a selected network link;
   c. determining a traffic metric representative of a traffic load on the selected network link;
   d. responsive to the traffic metric, regrouping flows into second flow lists corresponding to the selected network link, the regrouping balancing the transmission unit traffic among the network links; and
   e. transmitting the respective second flow list over the respective selected network link.

2. The method of claim 1, wherein each of the transmission units comprise one of a packet, a frame, a cell, and a combination thereof.

3. The method of claim 1, wherein each of the transmission units includes one of source information, destination information, and a combination thereof, and the disposing comprises characterizing each of the transmission units according to one of the source information, the destination information, and a combination thereof.

4. The method of claim 1, wherein the transmission unit traffic is effected using a predetermined link-layer transmission protocol.

5. The method of claim 4, wherein the predetermined link-layer transmission protocol is one of a packet-based protocol, a cell-based protocol, a frame-based protocol, and a combination thereof.

6. The method of claim 5, wherein the predetermined link-layer transmission protocol is one of an IEEE STD.802 protocol, an ATM protocol, an FDDI protocol, an X.25 protocol, an ISDN protocol, a CDPD protocol, and a Frame Relay protocol.

7. The method of claim 4, wherein the predetermined link-layer transmission protocol communicates the transmission unit traffic over the network links In-cooperation with a network-layer protocol.

8. The method of claim 4, wherein the predetermined link-layer transmission protocol communicates the transmission unit traffic over the network links in cooperation with a transport-layer protocol.

9. The method of claim 7, wherein the network-layer protocol cooperates with a transport-layer protocol to communicate the transmission unit traffic across the network links.

10. The method of claim 7, wherein the network-layer protocol is one of a connectionless protocol and a connection-based protocol.

11. The method of claim 10, wherein the network-layer protocol is a connectionless protocol, and the connectionless protocol is an internet protocol (IP).

12. The method of claim 10, wherein the network-layer protocol is one of an internet protocol (IP), a Switched Multi-megabit Data Service protocol (SMDS), a general packet radio service (GPRS), a Message Transfer Part Level 3 protocol (MTP3), an internet packet exchange protocol (IPX),. an X.25/X.75 protocol, a connectionless network protocol (CLNP), internet datagram protocol (IDP), a datagram delivery protocol (DDP), a Xerox Network Systems protocol (XNS), and a combination thereof.

13. The method of claim 9, wherein the transport-layer protocol is one of a connectionless protocol and a connection-based protocol.

14. The method of claim 13, wherein the transport-layer protocol is a connection-based protocol, and the connection-based protocol is a transmission control protocol (TCP).

15. The method of claim 13, wherein the transport-layer protocol is one of a transmission control protocol (TCP), a user datagram protocol (UDP), a NetBIOS protocol, an H.323 protocol, A GSM/CDMA protocol, a Stream Control Transmission Protocol (SCTP), and a combination thereof.

16. The method of claim 9, wherein the network-layer protocol is a connectionless protocol and the connectionless protocol is an internet protocol (IP), and wherein the transport-layer protocol is a connection-based protocol, and the connection-based protocol is a transmission control protocol (TCP).

17. The method of claim 1, wherein the network links are network links having heterogeneous speed.

18. A method for balancing transmission unit traffic over network links, comprising:
   a. disposing transmission units into flows;
   b. grouping flows into first flow lists, each of the first flow lists corresponding to a selected network link;
   c. determining a traffic metric representative of a traffic load on the selected network link;
   d. responsive to the traffic metric, regrouping flows into second flow lists corresponding to the selected network link, the regrouping balancing the transmission unit traffic among the network links; and
   e. transmitting the respective second flow list over the respective selected network link,
   wherein each of the transmission units includes one of source information, destination information, and a combination thereof, and the disposing comprises characterizing each of the transmission units according to one of the source information, the destination information, and a combination thereof, and
   wherein the first flow lists are ordered flow lists.

19. The method of claim 18, wherein each of the ordered flow list comprises a linked list ordered by flow size.

20. The method of claim 19, wherein the ordered flow list is ordered by decreasing flow size.

21. A method for balancing transmission unit traffic over network links, comprising:
   a. disposing transmission units into flows;
   b. grouping flows into first flow lists, each of the first flow lists corresponding to a selected network link;
   c. determining a traffic metric representative of a traffic load on the selected network link;
   d. responsive to the traffic metric, regrouping flows into second flow lists corresponding to the selected network link, the regrouping balancing the transmission unit traffic among the network links; and
   e. transmitting the respective second flow list over the respective selected network link,
   wherein determining a Traffic Metric representative of a traffic load on the selected network link comprises:

$$T_i(f_x, t) = \frac{\frac{(N_{Li}(f_x, t)) * K_i + N_{Si}(f_x, t)}{\Delta t} + T_i(f_x, t-1)}{2}$$

where
   $T(f_x, t)$ is a Traffic Metric of Flow $f_x$ in selected link i, sampled at time t;
   $N_{Li}(f_x, t)$ is the number of transmission units of Flow $f_x$ in selected link i, with a transmission unit size greater than or equal to a preselected size threshold, observed between time t−1 and time t;
   $N_{Si}(f_x, t)$ is the number of transmission units of Flow $f_x$ in selected link i, with a transmission unit size less than a preselected size threshold, observed between sampling time t−1 and time t;
   $K_{ix}$ is a predetermined link load factor; and
   $\Delta t$ the inter-sampling time, measured as the interval between time t−1 and time t, in selected link i.

22. The method of claim 21, wherein the Traffic Metric comprises an Aggregate Traffic Metric characterized by:

$$TA(i, t) = \sum_x T_i(f_x, t)$$

where
   TA (i,t) is an Aggregate Traffic Metric for selected link i, and
   $T_i(f_x, t)$ is the Traffic Metric of Flow $f_x$, in link i, sampled at time t.

23. The method of claim 22, wherein the Traffic Metric comprises a Scaled Aggregate Traffic Metric characterized by:

$$STA(i,t)=TA(i,t)*S(i,t)$$

where

STA(i,t) is the Scaled Aggregated Traffic Metrics observed at time t for network link i;

TA(i,t) is the Traffic Metric observed at time t for network link i; and

S(i,t) is a preselected scaling factor for network link i at time t.

24. The method of claim 23, wherein the Traffic Metric comprises a Link Group Arithmetric Mean characterized by:

$$M(t) = \frac{\sum_{i=1}^{n} STA(i,t)}{n}$$

where

M(t) is the Link Group Arithmetic Mean of Scaled Aggregated Traffic Metrics summed over all network links i;

STA(i,t) is the Scaled Aggregated Traffic Metrics observed at time t for network link i; and n is the number of active network links.

25. The method of claim 24, wherein the Traffic Metric comprises a Link Group Absolute Deviation characterized by:

$$D(t) = \frac{\sum_{i=1}^{n} |STA(i,t) - M(t)|}{n}$$

where

D(t) is the Link Group Absolute Deviation of the Scaled Aggregated Traffic Metrics summed over all network links i;

STA (i, t) is the Scaled Aggregated Traffic Metric observed at time t for network link i;

M(t) is the Link Group Arithmetic Mean of the Scaled Aggregated Traffic Metrics summed over all network links i; and n is the number of active network links.

26. The method of claim 25, wherein:

a. a HIGH traffic load on link i is characterized by $$STA(i,t) \geq M(t)+D(t);$$

b. a LOW traffic load on link i is characterized by $$STA(i,t) > M(T)-D(t);\text{ and}$$

c. a NORMAL traffic load on link i is characterized by $$M(t)+D(t)>STA(i.t) \geq M(t)-D(t).$$

27. The method of claim 26, wherein the regrouping comprises moving a preselected flow from a first flow list corresponding to a first preselected link having a HIGH traffic load to a second flow list corresponding to a second preselected link having one of a NORMAL traffic load and a LOW traffic load.

28. The method of claim 21, wherein the predetermined link load factor, $K_{i,x}$, for Flow x in link i is between about 1.0 and about 10.0.

29. The method of claim 28, wherein the predetermined link load factor, $K_{i,x}$, for Flow x in link i is between about 4.0 and about 5.0.

30. A method for balancing transmission unit traffic over heterogeneous speed network links, comprising:
 a. disposing transmission units into flows, wherein each of the transmission units includes one of source information, destination information, and a combination thereof, and the disposing comprises characterizing each of the transmission units according to one of the source information, the destination information, and a combination thereof, and wherein each of the transmission units comprise one of a packet, a frame, a cell, and a combination thereof;
 b. grouping flows into first flow lists, each of the first decreasing-size-ordered linked flow lists corresponding to a selected network link;
 c. determining a traffic metric representative of a traffic load on the selected network link;
 d. responsive to the traffic metric, regrouping flows into second decreasing-size-ordered linked flow lists corresponding to the selected network link, the regrouping balancing the transmission unit traffic among the network links; and
 e. transmitting the respective second flow list over the respective selected network link using a predetermined link-layer transmission protocol, wherein the predetermined link-layer transmission protocol communicates the transmission unit traffic over the network links in cooperation with a network-layer protocol; wherein the network-layer protocol cooperates with a transport-layer protocol to communicate the transmission unit traffic across the network links, and wherein each of the network-layer protocol and the transport-layer protocol is one of a connectionless protocol and a connection-based protocol.

31. A method for balancing transmission unit traffic over heterogeneous speed network links, comprising:
 a. disposing transmission units into flows, wherein each of the transmission units includes one of source information, destination information, and a combination thereof, and the disposing comprises characterizing each of the transmission units according to one of the source information, the destination information, and a combination thereof, and wherein each of the transmission units comprise one of a packet, a frame, a cell, and a combination thereof;
 b. grouping flows into first flow lists, each of the first decreasing-size-ordered linked flow lists corresponding to a selected network link;
 c. determining a traffic metric representative of a traffic load on the selected network link;
 d. responsive to the traffic metric, regrouping flows into second decreasing-size-ordered linked flow lists corresponding to the selected network link, the regrouping balancing the transmission unit traffic among the network links; and
 e. transmitting the respective second flow list over the respective selected network link using a predetermined link-layer transmission protocol, wherein the predetermined link-layer transmission protocol communicates the transmission unit traffic over the network links in cooperation with a network-layer protocol; wherein the network-layer protocol cooperates with a transport-layer protocol to communicate the transmission unit traffic across the network links, and wherein each of the network-layer protocol and the transport-layer protocol is one of a connectionless protocol and a connection-based protocol, wherein the predetermined link-layer transmission protocol is one of an IEEE STD.802 protocol, an ATM protocol, an FDDI protocol, an X.25 protocol, an ISDN protocol, a CDPD protocol, and a Frame Relay protocol; wherein the network-layer protocol is one of an internet protocol (IP), a Switched Multi-megabit Data Service protocol (SMDS), a general packet radio service (GPRS), a Message Transfer Part Level 3 protocol (MTP3), a an internet packet exchange protocol (IPX), an X.25/X.75 protocol, a connectionless network protocol (CLNP), internet datagram protocol (IDP), A datagram delivery protocol (DDP), A Xerox Network Systems protocol (XNS), AND a combination thereof; and wherein the transport-layer protocol is one of a transmission control protocol (TCP), A user datagram protocol (UDP), a NetBIOS protocol, an H.323 protocol, a GSM/CDMA protocol, a Stream Control Transmission Protocol (SCTP), and a combination thereof.

32. A method for balancing transmission unit traffic over heterogeneous speed network links, comprising:
  a. disposing transmission units into flows, wherein each of the transmission units includes one of source information, destination information, and a combination thereof, and the disposing comprises characterizing each of the transmission units according to one of the source information, the destination information, and a combination thereof, and wherein each of the transmission units comprise one of a packet, a frame, a cell, and a combination thereof;
  b. grouping flows into first flow lists, each of the first decreasing-size-ordered linked flow lists corresponding to a selected network link;
  c. determining a traffic metric representative of a traffic load on the selected network link;
  d. responsive to the traffic metric, regrouping flows into second decreasing-size-ordered linked flow lists corresponding to the selected network link, the regrouping balancing the transmission unit traffic among the network links; and
  e. transmitting the respective second flow list over the respective selected network link using a predetermined link-layer transmission protocol, wherein the predetermined link-layer transmission protocol communicates the transmission unit traffic over the network links in cooperation with a network-layer protocol; wherein the network-layer protocol cooperates with a transport-layer protocol to communicate the transmission unit traffic across the network links, and wherein each of the network-layer protocol and the transport-layer protocol is one of a connectionless protocol and a connection-based protocol, wherein the predetermined link-layer transmission protocol is an IEEE STD.802.3 protocol, wherein the network-layer protocol is an internet protocol (IP), and wherein the transport-layer protocol is a transmission control protocol (TCP).

33. The method of claim 32, wherein the Traffic Metric representative of a traffic load on the selected network link comprises a Link Group Arithmetic Mean and the determining the Traffic Metric comprises:
  a. determining a Link Traffic Flow Metric characterized by $$T_i(f_x, t) = \frac{\frac{N_{Li}(f_x, t)^* K_i + N_{Si}(f_x, t)}{\Delta t} + T_i(f_x, t-1)}{2}$$

where
  $T(f_x, t)$ is a Traffic Metric of Flow $f_x$ in selected link i, sampled at time t,
  $N_{Li}(f_x, t)$ is the number of transmission units of Flow $f_x$ in selected link i, with a transmission unit size greater than or equal to a preselected size threshold, observed between time t−1 and time t;
  $N_{Si}(f_x, t)$ is the number of transmission units of Flow $f_x$ in selected link i, with a transmission unit size less than a preselected size threshold, observed between sampling time t−1 and time t;
  $K_{ix}$, is a predetermined link load factor for Flow x in link i having a value in a range between about 4.0 and about 5.0, and
  $\Delta t$ the inter-sampling time, measured as the interval between time t−1 and time t, in selected link i;

b. determining an Aggregate Traffic Metric characterized by $$TA(i, t) = \sum_x T_i(f_x, t)$$

where
  TA (i,t) is an Aggregate Traffic Metric for selected link i, and
  $T_i(f_x, t)$ is the Traffic Metric of Flow $f_x$, in link i, sampled at time t;

c. determining a Scaled Aggregate Traffic Metric characterized by $$STA(i,t) = TA(i,t) * S(i,t)$$

where
  STA(i,t) is the Scaled Aggregated Traffic Metrics observed at time t for network link i;
  TA(i,t) is the Traffic Metric observed at time t for network link i; and
  S(i,t) is a preselected scaling factor for network link i at time t; and d. determining a Link Group Arithmetic Mean characterized by $$M(t) = \frac{\sum_{i=1}^{n} STA(i, t)}{n}$$

where
  M(t) is the Link Group Arithmetic Mean of Scaled Aggregated Traffic Metrics summed over all network links i;
  STA(i,t) is the Scaled Aggregated Traffic Metrics observed at time t for network link i; and
  n is the number of active network links.

34. The method of claim 33, further comprising determining a Link Group Absolute Deviation characterized by $$D(t) = \frac{\sum_{i=1}^{n} |STA(i, t) - M(t)|}{n}$$

where

D(t) is the Link Group Absolute Deviation of the Scaled Aggregated Traffic Metrics summed over all network links i;

STA (i,t) is the Scaled Aggregated Traffic Metric observed at time t for network link i;

M(t) is the Link Group Arithmetic Mean of the Scaled Aggregated Traffic Metrics summed over all network links i; and n is the number of active network links; and b. wherein (1) a HIGH traffic load on link i is characterized by $STA(i,t) \geq M(t) + D(t)$;

(2) a LOW traffic load on link i is characterized by $STA(i,t) < M(T) - D(t)$; and (3) a NORMAL traffic load on link i is characterized by $M(t) + D(t) > STA(i.t) \geq M(t) - D(t)$.

35. The method of claim 34, wherein the regrouping comprises moving a preselected flow from a first flow list corresponding to a first preselected link having a HIGH traffic load to a second flow list corresponding to a second preselected link having one of a NORMAL traffic load and a LOW traffic load.

36. A method for transmitting transmission units through a network, comprising:
  a. receiving a transmission unit from a transmission unit source;
  b. classifying the transmission unit according to a predetermined flow characteristic;
  c. selecting a preselected network link over which the transmission unit is to be transmitted;
  d. transmitting the transmission unit over the preselected network link; and
  e. monitoring the operation of a plurality of preselected network links, and reassigning the predetermined flow characteristic from a first preselected network link to a second preselected network link, if the first preselected network link operationally fails.

37. The method of claim 36, further comprising selecting the preselected network link according to the predetermined flow characteristic using a predetermined dynamic load balancing technique.

38. A computer readable medium encoded with a compute program for balancing transmission unit traffic over network links and the computer program comprises:
  a. computer readable program code which disposes transmission units into flows;
  b. computer readable program code which groups flows into first flow lists, each of the first flow lists corresponding to a selected network link;
  c. computer readable program code which determines a traffic metric representative of a traffic load on the selected network link;
  d. computer readable program code which, responsive to the traffic metric, re-assigns flows into second flow lists corresponding to the selected network link, the re-assigning balancing the transmission unit traffic among the network links; and
  e. computer readable program code which transmits the respective second flow list over the respective selected network link.

39. The computer program product of claim 38, wherein each of the transmission units comprises one of a packet, a frame, a cell, and a combination thereof.

40. The computer program product of claim 38, wherein each of the transmission units includes one of source information, destination information, and a combination thereof, and the disposing comprises characterizing each of the transmission units according to one of the source information, the destination information, and a combination thereof.

41. The computer program product of claim 38, wherein the transmission unit traffic is effected using a predetermined link-layer transmission protocol.

42. The computer program product of claim 41, wherein the predetermined link-layer transmission protocol is one of a packet-based protocol, a cell-based protocol, a frame-based protocol, and a combination thereof.

43. The computer program product of claim 42, wherein the predetermined link-layer transmission protocol is one of an IEEE STD.802 protocol, an ATM protocol, an FDDI protocol, an X.25 protocol, an ISDN protocol, a CDPD protocol, and a Frame Relay protocol.

44. The computer program product of claim 41, wherein the predetermined link-layer transmission protocol communicates the transmission unit traffic over the network links in cooperation with a network-layer protocol.

45. The computer program product of claim 41, wherein the predetermined link-layer transmission protocol communicates the transmission unit traffic over the network links in cooperation with a transport-layer protocol.

46. The computer program product of claim 44, wherein the network-layer protocol cooperates with a transport-layer protocol to communicate the transmission unit traffic across the network links.

47. The computer program product of claim 44, wherein the network-layer protocol is one of a connectionless protocol and a connection-based protocol.

48. The computer program product of claim 47, wherein the network-layer protocol is a connectionless protocol, and the connectionless protocol is an internet protocol (IP).

49. The computer program product of claim 47, wherein the network-layer protocol is one of an internet protocol (IP), a Switched Multi-megabit Data Service protocol (SMDS), a general packet radio service (GPRS), a Message Transfer Part Level 3 protocol (MTP3), a an internet packet exchange protocol (IPX), an X.25/X. 75 protocol, a connectionless network protocol (CLNP), internet datagram protocol (IDP), a datagram delivery protocol (DDP), a Xerox Network Systems protocol (XNS), and a combination thereof.

50. The computer program product of claim 46, wherein the transport-layer protocol is one of a connectionless protocol and a connection-based protocol.

51. The computer program product of claim 50, wherein the transport-layer protocol is a connection-based protocol, and the connection-based protocol is a transmission control protocol (TCP).

52. The computer program product of claim 50, wherein the transport-layer protocol is one of a transmission control protocol (TCP), a user datagram protocol (UDP), a NetBIOS protocol, an H.323 protocol, a GSM/CDMA protocol, a Stream Control Transmission Protocol (SCTP), and a combination thereof.

53. The computer program product of claim 46, wherein the network-layer protocol is a connectionless protocol and the connectionless protocol is an internet protocol (IP), and wherein the transport-layer protocol is a connection-based protocol, and the connection-based protocol is a transmission control protocol (TCP).

54. The computer program product of claim 38, wherein the network links are network links having heterogeneous speed.

55. A computer readable medium encoded with a compute program for balancing transmission until traffic over network links and the computer program comprises:
   a. computer readable program code which disposes transmission units into flows;
   b. computer readable program code which groups flows into first flow lists, each of the first flow lists corresponding to a selected network link;
   c. computer readable program code which determines a traffic metric representative of a traffic load on the selected network link;
   d. computer readable program code which, responsive to the traffic metric, re-assigns flows into second flow lists corresponding to the selected network link, the re-assigning balancing the transmission unit traffic among the network links and
   e. computer readable program code which transmits the respective second flow list over the respective selected network link,
   wherein each of the transmission units includes one of source information, destination information, and a combination thereof, and the disposing comprises characterizing each of the transmission units according to one of the source information, the destination information, and a combination thereof, and
   wherein the first flow lists are ordered flow lists.

56. The computer program product of claim 55, wherein each of the ordered flow list comprises a linked list ordered by flow size.

57. The computer program product of claim 56, wherein the ordered flow list is ordered by decreasing flow size.

58. A computer readable medium encoded with a compute program for balancing transmission until traffic over network links and the computer program comprises:
   a. computer readable program code which disposes transmission units into;
   b. computer readable program code which groups flows into first flow lists, each of the first flow lists corresponding to a selected network link;
   c. computer readable program code which determines a traffic metric representative of a traffic load on the selected network link;
   d. computer readable program code which, responsive to the traffic metric, re-assigns flows into second flow lists corresponding to the selected network link, the re-assigning balancing the transmission unit traffic among the network links; and
   e. computer readable program code which transmits the respective second flow list over the respective selected network link,
   wherein determining a Traffic Metric representative of a traffic load on the selected network link comprises:

$$T_i(f_x, t) = \frac{\frac{N_{Li}(f_x, t)^* K_i + N_{Si}(f_x, t)}{\Delta t} + T_i(f_x, t-1)}{2}$$

where
   $T(f_x,t)$ is a Traffic Metric of Flow $f_x$ in selected link i, sampled at time t,
   $N_{Li}(f_x,t)$ is the number of transmission units of Flow $f_x$ in selected link i, with a transmission unit size greater than or equal to a preselected size threshold, observed between time t−1 and time t;
   $N_{Si}(f_x,t)$ is the number of transmission units of Flow $f_x$ in selected link i, with a transmission unit size less than a preselected size threshold, observed between sampling time t−1 and time t;
   $K_{ix}$ is a predetermined link load factor for Flow x in link i having a value in a range between about 4.0 and about 5.0, and
   $\Delta t$ the inter-sampling time, measured as the interval between time t−1 and time t, in selected link I.

59. The computer program product of claim 58, wherein the Traffic Metric comprises an Aggregate Traffic Metric characterized by:

$$TA(i, t) = \sum_x T_i(f_x, t)$$

where
   TA (i,t) is an Aggregate Traffic Metric for selected link i, and
   $T_i(f_x,t)$ is the Traffic Metric of Flow $f_x$, in link i, sampled at time t.

60. The computer program product of claim 59, wherein the Traffic Metric comprises a Scaled Aggregate Traffic Metric characterized by:

$$STA(i,t) = TA(i,t)^* S(i,t)$$

where
   STA(i,t) is the Scaled Aggregated Traffic Metrics observed at time t for network link i;
   TA(i,t) is the Traffic Metric observed at time t for network link i; and
   S(i,t) is a preselected scaling factor for network link i at time t.

61. The computer program product of claim 60, wherein the Traffic Metric comprises a Link Group Arithmetic Mean characterized by:

$$M(t) = \frac{\sum_{i=1}^{n} STA(i, t)}{n}$$

where
   M(t) is the Link Group Arithmetic Mean of Scaled Aggregated Traffic Metrics summed over all network links i;
   STA(i,t) is the Scaled Aggregated Traffic Metrics observed at time t for network link i; and
   n is the number of active network links.

62. The computer program product of claim 61, wherein the Traffic Metric comprises a Link Group Absolute Deviation characterized by:

$$D(t) = \frac{\sum_{i=1}^{n} |STA(i, t) - M(t)|}{n}$$

where

D(t) is the Link Group Absolute Deviation of the Scaled Aggregated Traffic Metrics summed over all network links i;

STA (i,t) is the Scaled Aggregated Traffic Metric observed at time t for network link i;

M(t) is the Link Group Arithmetic Mean of the Scaled Aggregated Traffic Metrics summed over all network links i; and n is the number of active network links.

63. The computer program product of claim 62, wherein:
a. a HIGH traffic load on link i is characterized by $STA(i,t) \geq M(t)+D(t)$;

b. a LOW traffic load on link i is characterized by $STA(i,t) < M(T)-D(t)$; and c. a NORMAL traffic load on link i is characterized by $M(t)+D(t) > STA(i.t) \geq M(t)-D(t)$.

64. The computer program product of claim 63, wherein the regrouping comprises moving a preselected flow from a first flow list corresponding to a first preselected link having a HIGH traffic load to a second flow list corresponding to a second preselected link having one of a NORMAL traffic load and a LOW traffic load.

65. The computer program product of claim 58, wherein the predetermined link load factor, $K_{ix}$, for Flow x in link i is between about 1.0 and about 10.0.

66. The computer program product of claim 65, wherein the predetermined link load factor, $K_{ix}$, for Flow x in link i is between about 4.0 and about 5.0.

67. A network load balancer in a communication network having network links, comprising:

a. a flow synthesizer that receives transmission units from a transmission unit source, and synthesizes flows characteristic of selected transmission units;

b. a link classifier, coupled with the flow synthesizer and the network links, that classifies the network links relative to a predetermined flow metric, and assigns selected flows to selected network links responsive to the predetermined flow metric, the selected transmission units corresponding to the selected flows being communicated with the communication network through the respective selected network links; and a flow classifier, coupled with the link classifier, that determines flow characteristics representative of a plurality of selected flows, and responsive thereto, assigns the plurality of selected flows to a selected link such that the selected transmission units respectively represented by the plurality of selected flows are communicated with the communication network through the respective selected network links.

68. The network load balancer of claim 67, further comprising a link failure detector that causes the link classifier to re-assign the selected flows to others of the selected links in response to a network link failure.

* * * * *